United States Patent Office 2,772,180
Patented Nov. 27, 1956

2,772,180

PARTING COMPOSITIONS IN METAL MANUFACTURING

Robert Milton Neel, Madison County, Ill., and Oliver L. Niehouse, New York, N. Y., assignors to Olin Mathieson Chemical Corporation No Drawing. Application June 28, 1952,
Serial No. 296,262

7 Claims. (Cl. 106—286)

This invention relates generally to the formation of sheet metal fabrications and more particularly to a method for making hollow sheet metal fabrications from a plurality of metal sheets by a pressure welding process and to a novel separating or parting material for such sheet metal fabricating processes.

Various types of hollow or cavitated articles such as, for example, heat exchangers, refrigerator evaporators and similar articles of manufacture having fluid passageways therein, e. g. airplane propellers, airplane wings and like hollow structural members have been manufactured heretofore from a plurality of metal sheets by welding processes. In accordance with one type of process for making articles of the foregoing class, a pattern of separating or parting material is sandwiched between superposed sheets of metal in the areas thereof where hollow portions of the final product are desired and those areas which are not thus protected are subsequently bonded by pressure welding. Those areas of the metal sheets adjacent the pattern are then bulged or expanded by applying fluid pressure to the inner surfaces thereof. With processes of this type considerable difficulty has been encountered in practice due to the deficiencies of available parting materials. A large variety of materials have been proposed as suitable for this purpose such as, for instance, graphite, coal, coke, chalk powder, paint or lacquer, but none of these materials have been entirely satisfactory either because of difficulty experienced in applying them to the metal surfaces, shrinking of the pattern upon drying, flaking or peeling from the metal after drying, objectionable decomposition products at elevated temperatures or other equally undesirable properties.

It is therefore an object of this invention to provide a novel parting material for the formation of hollow or cavitated articles of metal by pressure welding which is devoid of the disadvantages inherent with prior materials. It is another object of this invention to provide an improved pressure welding process for forming cavitated metal articles of manufacture. A further object of this invention is to provide a method for forming hollow articles of manufacture from sheet metal. A still further object is to provide an improved pressure welding process for forming articles of manufacture having fluid passageways therein from sheet metal. Another object is to provide an improved pressure welding process for fabricating hollow structural members and similar fabrications from sheet metal. Still another object of this invention is to provide a parting material for sheet metal fabricating processes which is easily compounded without extreme variation in consistency and which is easily applied to the metal.

The foregoing objects as well as others which will become apparent from the following description are accomplished, generally speaking, by providing a novel pressure welding parting material of colloidal graphite and calcium carbonate. This invention further contemplates an improved process for forming hollow or cavitated articles from metal sheets which involves sandwiching a pattern of parting material containing colloidal graphite and calcium carbonate between superposed strips of metal, bonding those areas not protected by the parting material by pressure welding and expanding those areas which are thus protected by applying fluid pressure to the inner surfaces of the metal. It is preferred that the parting material contain about 40 percent to 75 percent calcium carbonate, about 13 percent to 5 percent colloidal graphite and about 1 percent wetting agent and the balance water. The preferred ratio is about one part colloidal graphite to about seven parts calcium carbonate. It has been found that the commercial product, "Aquadag," manufactured and sold by the Acheson Colloids Corporation, Port Huron, Michigan, is particularly well adapted for the purpose but other equivalent colloidal graphites can be utilized. "Aquadag" is a hydrosol of graphite in water containing a tannin as a dispersing or deflocculating agent and a minor amount of ammonia to adjust the pH of the dispersion to about 9. Calcium carbonate having a granulation such that about 95 percent of the particles pass through a screen having about 325 mesh per inch and 100 percent of the particles pass through a screen having 250 mesh per inch have been found suitable for the purpose. A ground aragonite, particularly ground oyster shells, is preferred as the form of calcium carbonate. Best results are obtained if the calcium carbonate has an average particle size of about one micron as determined by the air permeability test method described by Carman in the article entitled "Shape and Surface of Fine Powders by the Permeability Method" starting on page 24 of the publication "Symposium on New Methods for Particle Size Determination in the Subsieve Range" published by the American Society for Testing Materials, March 4, 1941.

Prior to application to the metal, the colloidal graphite, calcium carbonate and a wetting agent are thoroughly mixed. A preferred method of preparing the parting material involves dispersing the colloidal graphite, calcium carbonate and wetting agent in water by agitating in a Baker Perkins sigma type mixer which kneads and folds the material and coats the particles of calcium carbonate with the colloidal graphite particles, although the dispersion can be prepared in a ball mill or by other suitable means.

In one embodiment of this invention, a parting material is prepared from about 1350 parts by weight ground oyster shell having an average granulation of about one micron, about 900 parts "Aquadag," about 400 parts of a 5 percent solution in water of Tween #40 wetting agent manufactured by Atlas Powder Company, Wilmington, Delaware and about 200 parts water. Tween #40 is essentially polyoxyethylene sorbitan monopalmitate. In preparing the dispersion, about two-thirds of the oyster shell is mixed with about two-thirds of the "Aquadag" which is added thereto slowly until the mixture becomes lumpy and assumes the color of dirty sand. Additions of the Tween #40 wetting agent solution are made to reduce the consistency thereof to a dough. The remaining oyster shell and "Aquadag" are then added to the mixture and the remaining wetting agent is slowly added thereto as agitation is continued. The 200 parts water are then added after the other ingredients have been thoroughly mixed and agitation continued until a smooth uniform paste is obtained.

In making a hollow article of manufacture such as a refrigerator evaporator from sheet metal having the composition covered by U. S. Patent 2,295,180, granted to Edmund G. Mitchell September 8, 1952, two sheets of the metal each about 0.070 inch thick are degreased by immersion in an organic solvent bath, such as naphtha or gasoline or the like, at room temperature and then wiped free of solvent. Following the degreasing, the sheets are pickled at room temperature in an acid bath containing approximately one part by volume of 68 percent nitric acid, one part by volume of 95 percent sulfuric acid and one part by volume water. The sheets are then rinsed free from acids and air dried.

Parting material prepared as described in the foregoing is applied in a layer of about 0.001 inch to about 0.025 inch thickness by stenciling with a silk screen and squeegee to selected areas on the face of one of the sheets according to a predetermined pattern. The screen should preferably have about 170 to 200 meshes to the inch. The second sheet of metal is then superposed over and secured at the edges to the thus prepared sheet and the assembly heated in a furnace to about 900° C. in an inert atmosphere after which it is hot rolled in one pass to a thickness of about 0.07 inch, cleaned with acid, washed and dried as described in the foregoing in preparing the metal sheets for fabrication. The thus welded sheets are cold rolled to a finish gauge of about 0.048 inch thickness, annealed one hour at about 750° C. and again cleaned and pickled as in the foregoing. If the pattern of parting material extends to the edge of the sheet, the unbonded metal at that point is pried apart, suitable tubing is inserted therein and the inner unwelded areas of the assembly are expanded with fluid pressure of about 250 to 300 pounds per square inch. If the pattern does not extend to the edge of the welded sheets, a hole can be drilled to obtain access to the unbonded inner areas of the assembly.

It has been found that the parting material provided by this invention when applied in suitable thicknesses has elongation characteristics which are similar to the elongation characteristics of metal. A pattern of the parting material of this invention does not crack or break when the metal is pressure welded by rolling but elongates with the metal and thus provides a continuous film of parting material between the layers of metal which prevents pressure welding in the predetermined areas. Patterns of chalk or graphite, on the other hand, crack or break in the pressure welding operation when the metal is elongated and thus leave unprotected areas within the pattern between the layers of metal. The surfaces of the metal sheets adjacent these unprotected areas become welded together and thus result in an unsuitable product.

It has been further found that the major portion of the parting material provided by this invention, unlike the majority of those proposed heretofore, is easily removed from the cavities of the formed article. This is particularly true when the welding operation is conducted at temperatures above about 700° C. At these temperatures, most, if not all, of the calcium carbonate particles are converted into calcium oxide and when water is introduced into the cavities to remove the parting material therefrom calcium hydroxide and possibly some calcium carbonate are formed from the calcium oxide. Due to these chemical reactions, the calcium carbonate particles of the parting material do not cling tenaciously to the metal surfaces after the welding step has been consummated and are thus easily removed from the cavities. In fact, in many instances, the calcium carbonate particles can be removed from the cavities with a water rinse although a pickle such as described in the foregoing embodiment is preferred. The colloidal graphite particles, on the other hand, cling tenaciously to the metal surfaces bounding the cavity and are not removed in the pickling or rinsing steps which has not been found objectionable in the finished product. In fact, in some products such as heat exchangers the adherent film of graphite remaining in the cavity is advantageous from a heat transfer standpoint.

Another characteristic of the parting material is that its consistency is not appreciably affected by minor variations in amounts of each ingredient utilized. This characteristic is particularly valuable in practice as minor mistakes in weighing or measuring of the various ingredients of the formulation or other inaccuracies during formulation of the material are not fatal. In addition, the consistency of the parting material of this invention can be altered and controlled to conform to the particular requirement of any process by varying the pH. If it is desired to increase the consistency of the parting material, additions of acidic materials such as acetic acid or solutions of calcium acetate or alum can be added. Conversely, if it is desired to decrease the consistency of the parting material, the pH can be increased by small additions of an alkali. Variations can also be made in the amount of wetting agent utilized to alter the consistency of the parting material. The effect of pH of the parting material upon the consistency thereof has been found most pronounced when "Aquadag" is utilized as the source of colloidal graphite and for this reason, it is preferred, although not necessarily a requisite, that about one or two percent tannin or other deflocculating agent such as, for example, dextrin, sumac or oak-bark extracts be included in the formula of parting materials when other colloidal graphites are utilized. These materials reduce the surface tension of water and thus aid in dispersing the colloidal graphite particles by the disaggregation of coarse particles into particles of colloidal dimensions.

The parting material provided by this invention can be applied easily to metal surfaces and forms a continuous adherent pattern thereon. It does not peel or otherwise become separated from the metal surface during normal handling operations prior to welding and does not shrink appreciably while drying or under normal storage conditions. Yet, as pointed out above, after welding, the major and undesirable portion thereof is easily removed from the metal after subjection to the temperatures normally encountered in most pressure welding processes.

While in the foregoing embodiments, the invention has been described in detail for the purpose of illustration, many variations can be made without departing from the spirit of the invention. For instance, the percentage reduction of the thickness of the assembled sheets of metal in the hot rolling step of the process can be varied over a relatively wide range although an approximate 50 percent reduction in thickness as described in the foregoing is preferred to affect good welding of copper alloys. The cold rolling step can be eliminated from a process for making some articles of manufacture but is advantageous particularly where accurate thickness tolerances and greater strength of the finished product are required. The pressure required for expanding the assembly in the unwelded areas will of course vary with the thickness of the metal sheets, hardness thereof, etc. The various temperatures and other conditions specified in the foregoing can also be varied and articles can be made from other metals such as aluminum, steel and other copper alloys in accordance with this invention. The parting material can be applied to the sheet metal by means of a metal screen or by spraying or brushing provided proper adjustments in consistency are made. In addition, various other wetting agents such as, for example, polyoxyethylene sorbitan monolaurate, polyoxyethylene sorbitan monostearate or polyoxyethylene sorbitan oleate and the like can be substituted for the Tween #40. In some instances, it is desirable to spot weld or clamp the sheets of metal having the parting material sandwiched therebetween to avoid separation thereof or distortion of the pattern during handling prior to pressure welding. Also, in some processes the welded sheets can be expanded while confined in suitable dies to facilitate control of the configuration and size of the hollowed portion of the article being manufactured. Under some conditions, additional water might be required in the embodiment described above, to obtain the proper consistency for the particular application. For instance, more water may be required to compensate for evaporation under certain weather conditions.

Having thus described the invention, what is claimed and desired to secure by Letters Patent is:

1. As a new composition of matter, a parting material suitable for sandwiching between face to face surfaces of superposed pressure weldable metal sheets for preventing welding of the sheets in those areas separated thereby during pressure welding, the solid constituents of which consist essentially of particles of colloidal graphite and particles of calcium carbonate in the ratio of from about 5 to about 13 parts to from about 40 to about 75 parts respectively.

2. As a new composition of matter, a parting material suitable for sandwiching between face to face surfaces of superposed pressure weldable metal sheets for preventing welding of the sheets in those areas separated thereby during pressure welding, the solid constituents of which consist essentially of particles of colloidal graphite, particles of oyster shells in the ratio of from about 5 to about 13 parts to from about 40 to about 75 parts respectively.

3. As a new composition of matter, a parting material suitable for sandwiching between face-to-face surfaces of superposed pressure weldable metal sheets for preventing welding of the sheets in those areas separated thereby during pressure welding which comprises from about 40 to about 75 percent calcium carbonate, from about 5 to about 13 percent colloidal graphite, about 1 percent of a wetting agent, and the remainder water.

4. The composition of claim 3 wherein about 95 percent of the calcium carbonate particles will pass through the openings in a 325 mesh per inch screen and 100 percent of the particles will pass through a 250 mesh per inch screen.

5. The composition of claim 1 wherein said particles of calcium carbonate are coated with the particles of colloidal graphite.

6. The composition of claim 2 wherein said oyster shell particles are coated with particles of colloidal graphite.

7. As a new composition of matter, a parting material suitable for sandwiching between face-to-face surfaces of superposed pressure weldable metal sheets for preventing welding of the sheets in those areas separated thereby during pressure welding which comprises from about 40 to about 75 percent oyster shells, from about 5 to about 13 percent colloidal graphite, about 1 percent of a wetting agent, and the remainder water.

References Cited in the file of this patent

UNITED STATES PATENTS

| | | |
|---|---|---|
| 844,989 | Acheson | Feb. 19, 1907 |
| 1,709,865 | Muffly | Apr. 23, 1929 |
| 1,712,085 | Little | May 7, 1929 |
| 1,779,911 | Little | Oct. 28, 1930 |
| 1,933,271 | Leun | Oct. 31, 1933 |
| 2,160,558 | Orr | May 30, 1939 |
| 2,161,116 | White | June 6, 1939 |
| 2,212,481 | Sendzimir | Aug. 20, 1940 |
| 2,219,583 | Vande | Oct. 29, 1940 |
| 2,333,343 | Sendzimir | Nov. 2, 1943 |
| 2,414,625 | Abrams | Jan. 21, 1945 |
| 2,662,273 | Long | Dec. 15, 1953 |
| 2,690,002 | Grenell | Sept. 28, 1954 |

FOREIGN PATENTS

| | | |
|---|---|---|
| 895,375 | France | Jan. 23, 1945 |